Sept. 8, 1925.
E. W. WESCOTT
1,552,786
PROCESS OF TREATING ORES CONTAINING IRON
Filed July 14, 1922
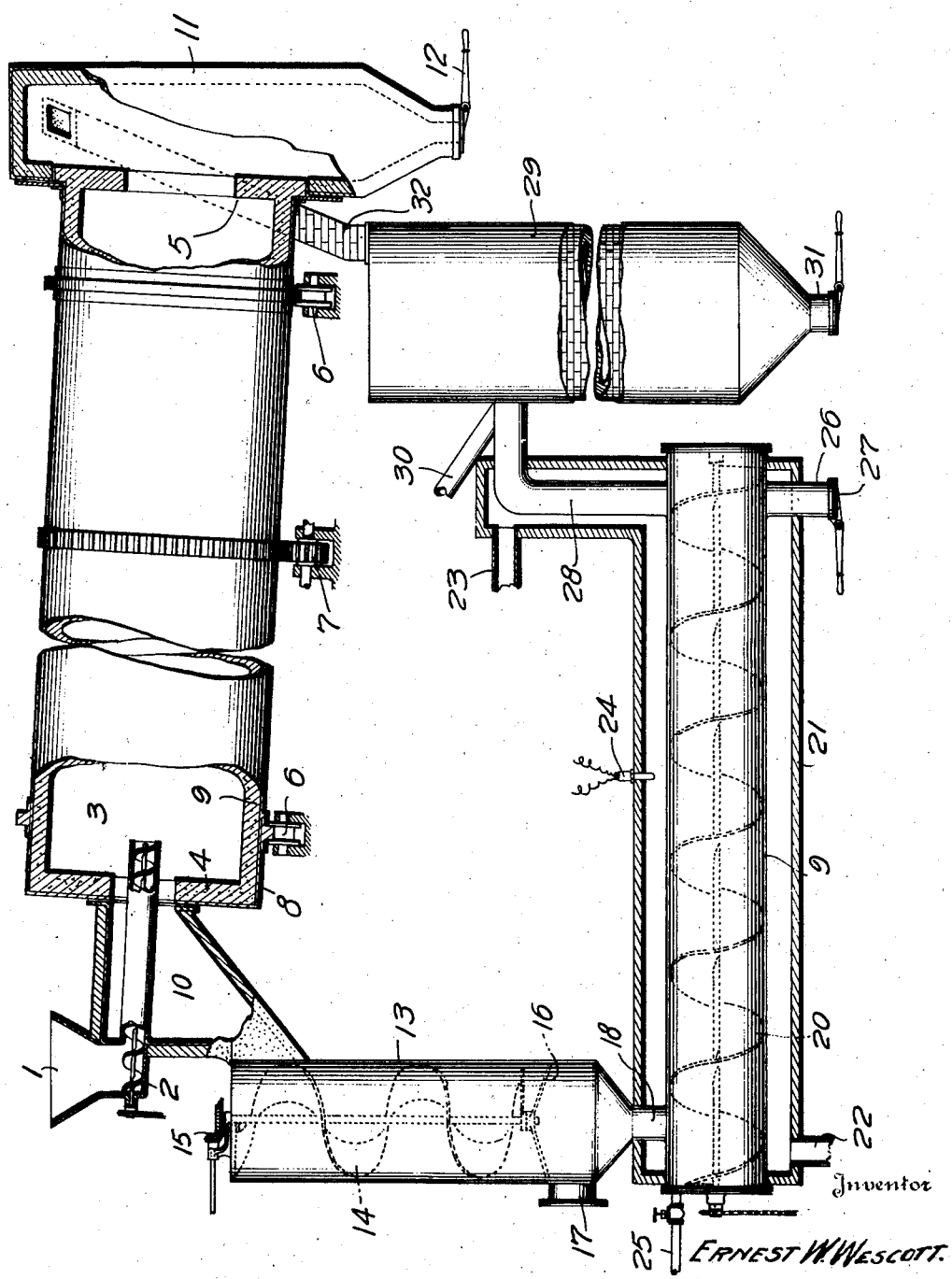
Inventor
ERNEST W. WESCOTT.
By
K. P. McElroy
His Attorney Patented Sept. 8, 1925.

1,552,786

UNITED STATES PATENT OFFICE.

ERNEST W. WESCOTT, OF NIAGARA FALLS, NEW YORK, ASSIGNOR TO KALMUS, COMSTOCK & WESCOTT, INCORPORATED, OF BOSTON, MASSACHUSETTS, A CORPORATION OF MASSACHUSETTS.

PROCESS OF TREATING ORES CONTAINING IRON.

Application filed July 14, 1922. Serial No. 574,985.

*To all whom it may concern:*

Be it known that I, ERNEST W. WESCOTT, a citizen of the United States, residing at Niagara Falls, in the county of Niagara and State of New York, have invented certain new and useful Improvements in Processes of Treating Ores Containing Iron, of which the following is a specification.

This invention relates to processes of treating ores containing iron; and it comprises a method of separating and recovering iron oxid, as in utilizing lean iron ores, purifying bauxite, sand, etc., treating complex ores containing iron oxid as well as other values, etc., wherein the ore or material is treated with chlorin in the presence of a reducing agent to produce and volatilize ferric chlorid away from residual solids, the ferric chlorid is oxidized in vapor form with oxygen (air) to produce chlorin and iron oxid, and the chlorin is returned to serve in the treatment of more material; all as more fully hereinafter set forth and as claimed.

It is the purpose of the present invention to provide a ready, economical and efficient method of removing or recovering iron oxid, useful in many relations, as in producing iron oxid in a concentrated form from lean iron ores (enriching iron ores), in treating iron ores containing, in addition to iron oxid, various other values, in purifying bauxite intended for making aluminum preparations and aluminum, in purifying glass sands, etc. To this end, advantage is taken of the ready interconvertibility of ferric oxid and ferric chlorid, the iron oxid of the ore or material being vaporized and removed as ferric chlorid with the aid of chlorin and the ferric chlorid burnt with oxygen (air) to regain the chlorin and recover the iron oxid. The chlorin used in the process is, so to speak, merely a carrying agent for the iron oxid and is not lost but used repeatedly in a cyclic manner. Incidental losses of chlorin are generally quite small, and very little is needed for replenishing or make-up additions. That used for the stock and for make-up additions may be from any suitable source, such as electrolytic chlorin, Deacon chlorin, commercial liquid chlorin, etc.

In practical embodiments of my invention, the ore or material is treated with chlorin in the presence of a reducing body little reactive with either chlorin or iron, such as carbon or producer gas at a temperature sufficient to form and volatilize ferric chlorid formed in the treatment, the vapors being led from the reaction chamber for disposition elsewhere. The gangue is freed of iron oxid and left behind. With some ores, with the gangue are left greater or less proportions of relatively non-volatile heavy metal chlorids. When present some proportion of these chlorids may go forward with the ferric chlorid vapors, from which they are readily separated. In either event they may form a valuable by-product. The removal of iron from the material may be made as complete as may be desirable or economically feasible. Such fixed chlorids as remain in the gangue are readily available and may be removed by leaching with water or an appropriate solvent.

In order to regain the chlorin for re-use and to reproduce the iron oxid, the ferric chlorid in the form of vapor is burnt with oxygen (air). As I have found, ferric chlorid in the vapor form exposed to the action of oxygen or air at a temperature around 700° to 800° C. is easily converted into ferric oxide and free chlorin. The reaction is smooth and complete and is rapid at temperatures around 800° C. The iron is oxidized and the chlorin set free. By the use of a slight excess of ferric chlorid, the utilization of the oxygen may be quantitative, or practically so, giving a practically pure chlorin; while with the use of a slight excess of air, all the ferric chlorid is converted into ferric oxid. By proper proportioning of the volume of air and of ferric chlorid, it is practicable to produce a hot mixture of nitrogen and chlorin containing 30 per cent or so of chlorin, a gas mixture very well adapted for use in the first step of the process.

In most embodiments of my process and in the embodiment at present preferred by me, I cool and condense the vapors of ferric chlorid coming from the reaction vessel prior to performing the stated oxidation, thereby getting rid of the accompanying waste gases which are mainly nitrogen and carbon oxids. Any volatile non-metallic chlorids (sulfur, phosphorus, arsenic, etc.) which may be present in the mixture coming from the reaction chamber go forward with these waste gases and may be separated therefrom by suitable condensation or scrubbing means. With the ferric chlorid are condensed the vapors of any other heavy metal chlorids which may have gone forward therewith. There is generally also a certain amount of ore dust carried forward from the reaction vessel, although this may be, to a great extent, separated by leading the hot vapors through a suitable settling chamber on their way to the condenser. As I usually practice the process, after condensing the ferric chlorid I reheat it to vaporize it, leaving behind the ore dust and such other metallic chlorids as may be present. The vapors are quite pure, even in the case of very impure ores. The ferric chlorid vapors are led into a suitable oxidizing chamber, which is best rather roomy, and are burnt with air at a temperature around 800° C. The particular dimensions and type of chamber depend to some extent upon the physical form of iron oxid desired. The iron oxid formed settles out and is recovered and removed in any suitable way. It may come down in a crystalline form or as very fine pulverulent material, according to conditions. In a general way, it may be said that the greater the time offered, that is, the greater the time during which materials remain at a high temperature, the coarser and more easily settled is the iron oxid. As a general rule, I find it better to so adjust conditions that the gases shall remain at the reaction temperature 8 to 12 seconds, in recovering the oxid for metallurgical purposes. This gives a fine grained product which may be readily sintered in the usual way. If the time offered be less than 3 or 4 seconds, the resultant material is generally very fine; fine enough to make it highly useful for pigmentary and paint purposes and as a filler for rubber, etc., etc. The air used in oxidizing should be highly preheated, the amount of preheat necessary of course depending somewhat on the heat available in the ferric chlorid vapors. If the ferric chlorid vapors are at, say, 350° C., the air should be at 1050° C. to give the desired temperature of about 800° C. in the oxidation chamber. With oxygen or enriched air, the temperature conditions are somewhat different; and their use offers many advantages where they are available. With air, I generally employ slightly more than the volume theoretically necessary, giving me an effluent gas containing about 30 per cent of chlorin by volume, the rest being nitrogen, etc. Using oxygen in the right amount, a substantially pure chlorin can be made.

In the described process, the presence of moisture is undesirable, as leading to the formation of HCl and loss of chlorin; and while this loss may be obviated to a greater or less extent by various expedients, I find it better to operate with my materials (ore, carbon and air) as dry and free of moisture or hydrogen as possible. In most of the embodiments of my invention, I therefore heat the ore or material to be treated prior to chlorination, sufficiently to remove moisture, free or combined. Iron oxid itself is readily dried but accompanying minerals, such as alumina and bauxite, are often somewhat more difficult to dehydrate. In dehydration, in a measure, time and temperature are reciprocal. The dry material is next mixed with a little carbon, to take care of the oxygen of the $Fe_2O_3$. It is desirable to use coke, anthracite or charcoal as free of volatiles as possible. The carbon is also advantageously preheated. It is not desirable to use more carbon than corresponds to approximately 12 or 13 per cent of the $Fe_2O_3$ present. If desired, the ore and the carbon may be heated together to produce a partial reaction prior to introducing chlorin. Or the ore may be partially deoxidized with producer gas simultaneously with, or subsequent to, drying. The ore, pre-reduced or not is next, contacted with chlorin coming from a later stage in the operation and at a relatively high temperature.

The temperature required in the chlorination operation is not high, being around 400–450° C.; nor is any great volume of heat necessary, the requirements of course, varying with the design of apparatus, the amount of radiation loss, etc. In a general way, with apparatus of sufficient size to give a small radiation loss and with properly preheated gases and materials rich in iron oxid, the reaction is, or may be, self-supporting. The apparatus may be heated from an external source, but this is inconvenient and is better avoided. By a pre-reduction of the material, giving a certain amount of metallic iron or FeO, the action of the chlorin becomes highly exothermic and where much heat is required in the reaction apparatus, it is commonly most convenient to develop it in this way: by a pre-reduction as well as by pre-heating of the ore to be treated. In the reaction, the carbon present is nearly entirely converted into $CO_2$, but a small proportion of CO being ordinarily formed, and this fact contributes to the thermal economy of the process. Ordinarily, I work with the material reduced to a finely powdered condition and produce through contact by the use of some form of rotary drum or kiln. It is convenient to feed the powdered material in counter-current against the chlorine in a slightly inclined kiln; which is best shouldered in order to preserve a substantial bed of material therein. Where a chlorin-nitrogen mixture from a later stage of the operation at a temperature of 700–800° C. is employed, the stripped gangue is discharged at about this temperature. The temperature at the other end of the rotor, where the solids enter and the vapors are discharged, is best maintained at about 450° C.

With proper operation and with dry materials, very little chlorin goes forward with the effluent gases and vapors, either as such or as HCl. The effluent gases and vapors may carry some other heavy metallic chlorids in small amount. For example, in the presence of nickel, some amount of nickel chlorid goes forward with the ferric chlorid. The same is true of cobalt, copper, silver, etc. Sulfur and phosphorus are also volatilized to some extent. On cooling the effluent gases and vapors down to, say, 100 or 150° C., the ferric chlorid is condensed and with it any other heavy metal chlorid which may be present. The uncondensed gases and vapors go forward to a suitable scrubbing system, if it be desirable to recover sulfur or phosphorus. If the gases be not scrubbed, their heat may be utilized in assisting in dehydrating the ore. If, for any reason, it be desirable to so conduct the operation that an excess of chlorin is present, this may be removed by adsorption in charcoal, coke or the like; the charged carbon being afterwards returned to the system in the chlorinating stage.

The condensed ferric chlorid, together with some ore dust, is transferred from the condensing arrangement to a vaporizer wherein it is heated. The ferric chlorid volatilizes, leaving behind it any other metal chlorids, such as silver chlorid, nickel chlorid, etc., which may be present and also the ore dust which may have gone forward with the vapors. The solid residue may be treated in any desired way to extract values present. If it contains much iron or ferric chlorid, it may go back into the system for retreatment.

It is commonly convenient to run a small stream of air or chlorin through the volatilizing chamber, partly to assist in the volatilization of the ferric chlorid and carry it forward and partly to maintain an oxidizing atmosphere to prevent the formation of ferrous chlorid. The volatilizer can be made of iron and operated at an external temperature of 400–425° C., the iron being protected by the formation of an adherent dense coating of ferrous chlorid. However, certain other and more resistant metals of the nature of alloys can be used to advantage. In a general way in ferrous alloys the presence of any other metal, such as chromium, nickel, cobalt, etc., giving chlorids less volatile than ferric chlorid, increases the resistivity of iron. The vapors coming from the volatilizer may be passed through a superheater prior to their entering into the combustion chamber proper. The superheater may be made of the special alloys mentioned, or of ceramic materials. It is desirable to have the ferric chlorid vapors enter the combustion chamber at a temperature between 400 and 500° C. The combustion chamber itself may be a cylindrical tower and brick built, the gases entering tangentially at a mid-point. It is well to heat insulate this chamber.

As will be obvious, the foregoing process can be used for removing the iron from clays and sands to fit them for ceramic purposes. It may be used for purifying bauxite to free it of iron. I, however, regard it as more particularly applicable to materials richer in iron, such as iron ores or other ores or materials containing metallic values and rich in iron oxid. It is, for instance, particularly valuable in treating certain pyrites cinders. These cinders may, and often do, contain copper, nickel or cobalt or all three in proportions rendering the use of the present process desirable. One such cinder available, for example, carries 60 per cent iron, 1 per cent cobalt, 0.3 per cent nickel and 3 per cent copper together with considerable sulfur. By the present method the sulfur is largely removed and the copper, nickel and cobalt are recovered in a desirable form, as chlorid. It may be noted in this connection, however, that the more sulfur is present in the material treated, the greater is the loss of chlorin.

I shall, however, describe my process more particularly with regard to the treatment of certain Cuban iron ores. Similar ores are found in other parts of the world, notably in Greece and in New Caledonia. These ores carry 40 to 50 per cent iron but they also carry considerable alumina, which introduces fluxing difficulties in the blast furnace. They also contain a small amount of nickel and some chromite, both of which are worth recovering while neither is desirable in an ore used to make merchant iron. In beneficiating these ores by the present invention, the ore is dehydrated and powdered. Drying is advantageously done in a rotary kiln of some type. Comminution is advantageously quite fine, often so that 95 to 98 per cent shall pass through a 100-mesh sieve. The degree of comminution necessary depends however greatly on the size of the mineral grains and upon the amount of gangue in the mineral treated. The finer the grinding, the more rapid the chlorination but in each case a limit must be set by consideration of the cost of grinding and of rehandling excessive dust, as against increased kiln capacity. The ore is then mixed with a little fine carbon. Or it may be reduced with producer gas. The hot reduced ore, or a hot mixture of ore and carbon, is placed in a rotary agitating drum or kiln maintained at a temperature of about 450° C. at the ore entrance end. Outside heat may be employed but is in general not necessary. Over and through the ore is transmitted a hot mixture of nitrogen and chlorin coming from a later operation. The iron oxid is volatilized as ferric chlorid. With it generally goes some or all of the nickel present. The residue, after chlorination, contains the gangue. Any contained nickel chlorid, can be extracted by leaching. It also contains more or less chromite, which can be separated and recovered by gravital recovery methods, such as shaking tables. The vapors of ferric chlorid, carrying some ore dust and some nickel chlorid, pass into a condenser, where the ferric chlorid is deposited. Sulfur chlorid, etc., for the most part pass on uncondensed. The ferric chlorid is next heated to a temperature above 350° and vaporizes, leaving behind it ore dust containing some nickel chlorid. The nickel chlorid is recovered by leaching. The vaporized ferric chlorid is burnt with hot air, as previously described, giving the chlorin-nitrogen mixture used in the first stages of the operation.

Instead of chlorin, in the present invention I may use bromin, volatilizing the oxid of iron as ferric bromid, burning the bromid to reproduce bromin and iron oxid, and returning the bromin to the system for use anew. This procedure offers some advantages and because of the economy of halogen possible in the present process, the use of bromin is practicable. Wherever I have mentioned chlorin, therefore, I wish it to be understood that I may use bromin in its lieu.

In the accompanying illustration, I have shown more or less diagrammatically, certain types of apparatus useful in the present invention. The view is partly in elevation and partly in central, vertical, longitudinal section.

In this showing, element 1 is a hopper supplying iron ore or the like to conveyor mechanism 2, this ore having been previously heated or partially reduced by means not shown. The ore is taken forward by the conveyor and delivered into a rotary inclined kiln-like structure 3 provided with shouldered ends 4 and 5. This kiln turns on rollers 6 and is actuated by suitable mechanism 7. As shown, it has a metal casing 8 lined with brick or ceramic composition 9. At the upper or feed end, it abuts against a flanged vapor conduit 10 suitably heat insulated. At the other or lower end, it abuts against the gangue receptacle 11 in a similar manner. The gangue receptacle is provided with gate 12 for removing solids from time to time. The vapors of ferric chlorid pass through the vapor conduit into condenser 13. As shown, this condenser is vertical and is provided with internal conveyor or wall scraping mechanism 14 actuated from a source of power (not shown) by means 15. At the bottom, it is stepped in spider 16. Uncondensed vapors and gases pass to a place of disposition, not shown, through conduit 17. As already stated, this conduit may, if desired, communicate with condensing and scrubbing means for removal of phosphorus chlorid, sulfur chlorid, etc. The condensed ferric chlorid drops through conduit 18 and vapor seal not shown into a vaporizer. As shown, this vaporizer comprises a tubular metal conduit 19 containing conveyor 20. The conduit and conveyor may be made, as noted, of iron or of a more resistant alloy, such as a chrome-iron alloy. External heat is afforded by heating casing 21 receiving fire gases or the like at 22, the heating medium passing to exit at 23. The casing is provided with pyrometer 24 for indicating temperatures. Valved inlet 25 is provided for introducing a modicum of air or air and chlorin to assist in vaporizing the chlorid and preventing reduction. At times, more or less coke dust passes forward with the ferric chlorid and may here exercise a reducing action. The ore dust and fixed chlorids, stripped of ferric chlorid, are sent to a suitable place of disposition through outlet 26, provided with gate 27. Vapors of ferric chlorid pass, as shown, upwardly through the heat insulated conduit 28 to a combustion or oxidizing chamber 29, wherein the iron is reoxidized and the chlorin set free by the aid of regulated amounts of air introduced through air inlet 30. The air inlet communicates with means (not shown), such as regenerators or recuperators, for heating the air to a high temperature. The oxidation chamber should be as thoroughly heat-insulated as practicable. It may be built of special non-conductive brick. Within the oxidation chamber, the iron oxid produced settles to the bottom and is removed at outlet 31 from time to time or continuously. With the particular type of chamber shown, other things being equal, the finess of the oxid settling depends, in a measure, upon the dimensions and internal contour of the chamber, these affecting the time offered the iron oxid to crystalize. Where well crystalized material is obtained, the particles are generally more or less micaceous; they tend to be in the form of thin, flattened leaflets. With proper regulation between the proportions of ferric chlorid vapors entering from 28 and air from 30, and with proper control of temperatures, etc., the reaction between the $O_2$ of the air and the $FeCl_3$ is smooth and practically quantitative. Ordinarily, I so regulate conditions as to obtain a mixture of chlorin and nitrogen, etc., carrying about 30 per cent of chlorin by volume and at a temperature of 700 to 800° C. Where ferric chlorid can be obtained, my invention is susceptible of use in producing pure chlorin or chlorin-containing gases for general purposes. However, for the present purposes, I am describing my invention as embodied in the production of ferric chlorid from iron ore and the like, reproduction of the chlorin used therefor, and re-use of the reproduced chlorin for making more ferric chlorid. The hot mixture of chlorin and nitrogen passes through conduit 32 into the stated gangue receptacle (11) and the reaction chamber.

In the use of the described structure, circulation throughout the system is more or less automatic, because of the cooling and condensation in the ferric chlorid receiver and the expansion in the chlorid vaporizer 19 and combustion chamber 29.

In addition to the iron ores, etc., recited, the present process is applicable to various concentrates and ores. The well known copper nickel ores of the Sudbury district of Canada, which have a large iron content, can be roasted to a low sulfur content and then treated with advantage by the present process while they are still hot from roasting. Some of the copper and nickel go forward with the ferric chlorid and can be recovered from the residue delivered by the vaporizer, but, for the most part, they are delivered as fixed chlorid with the gangue, whence they may be extracted by leaching. Certain titaniferous iron ores may also be advantageously treated by the present process, yielding a titanium concentrate as a useful product. Where these ores contain vanadium, as they often do, the vanadium is also placed in condition for easy recovery.

As shown, the ferric chlorid vapors leave the reaction chamber and pass practically directly to the ferric chlorid condenser. But, if desired, they may go through intermediate dust settling chambers of iron lined with brick or ceramic material to settle out the bulk of the dust prior to condensing the ferric chlorid. In so doing, the gases may be cooled to approximately 300° C. prior to entering the condenser. In the condenser it is advantageous so to operate that the gases pass slowly downward with as little stirring as is consistent with keeping the walls clear. It is better to obtain the condensate more on the walls than as a fog of suspended particles; i. e., I desire to obtain, so to speak, an annular cooling of the downward passing prism of vapors and gases rather than any convectional cooling which would result in the formation of a fog of fine particles.

The use of very fine iron oxid crystallized from aerial suspension as micaceous particles as a filler for rubber is advantageous.

What I claim is:

1. In the removal and recovery of iron oxid from materials containing the same, the cyclic process which comprises treating a material containing iron oxid with chlorin under reducing conditions to produce ferric chlorid, treating the produced ferric chlorid in vapor form with air to reform ferric oxid and chlorin, and returning the chlorin to serve anew.

2. In the removal and recovery of iron oxid from materials containing the same, the process which comprises heating a material containing iron oxid in the presence of chlorid under reducing conditions to produce vapors of ferric chlorid, cooling the effluent gases and vapors to condense ferric chlorid therefrom, revaporizing such ferric chlorid, contacting the vapors with hot air to reform ferric oxid and chlorin, and returning the chlorin for reuse.

3. In the manufacture of chlorin for industrial purposes, the process which comprises vaporizing ferric chlorid, admixing with air at a temperature around 800° C. and separating and removing the iron oxid produced.

4. In the manufacture of chlorin for industrial purposes, the process which comprises vaporizing ferric chlorid, burning the vapors with oxygen at about 800° C. and removing the oxid of iron formed.

5. The process of removing and recovering iron oxid from low grade iron ores containing oxid which comprises treating such an iron ore with chlorin and carbon to produce vapors of ferric chlorid, condensing the vapors of ferric chlorid, revaporizing and oxidizing the vapors with hot air to produce chlorin and oxid of iron.

6. In the treatment of iron ores containing iron oxid and other values, the process which comprises chlorinating such an ore under reducing conditions to produce vapors of ferric chlorid, removing and condensing the ferric chlorid vapors, revaporizing the ferric chlorid and recovering other chlorids from the volatilization residues and oxidizing the ferric chlorid in vapor form with air to reproduce chlorin and iron oxid.

7. The process of removing and recovering iron oxid which comprises treating material containing the same with chlorin under reducing conditions at a temperature around 450° C. to produce vapors of ferric chlorid and burning said ferric chlorid in a vapor form and at a temperature of 700 to 800° C. with oxygen to reproduce the chlorin and the iron oxid.

8. The process of removing and recovering iron oxid from materials comprising the same which comprises drying such a material and heating it, reducing the iron oxid, passing chlorin into contact with said oxid at a temperature around 450° C., removing the vapors of ferric chlorid formed, condensing and revaporizing to regain dust and fixed chlorids and burning the vaporized chlorid to reproduce chlorin and iron oxid.

9. In the removal and recovery of iron oxid from materials containing the same the process which comprises producing ferric chlorid from such oxid and burning said ferric chlorid with oxygen at a temperature around 800° C., the reacting materials being kept at the combustion temperature for a period of time of the order of 3 to 12 seconds to produce a fine grained oxid.

10. In the recovery of iron oxid from ferric chlorid the process which comprises leading vapors of ferric chlorid together with heated air into a roomy reaction chamber at a temperature in the neighorhood of 800° C. and gravitally separating the fine iron oxid produced from the chlorin-containing gas.

11. In the treatment of materials containing iron oxid as well as other heavy metal values, the process which comprises removing the iron oxid from such a material by treatment with chlorin under reducing conditions at a temperature around 450° C., removing the vapors of ferric chlorid produced, recovering the fixed metal chlorids also produced and burning the ferric chlorid in the vapor form to reproduce chlorin and iron oxid.

In testimony whereof I have hereunto affixed my signature.

ERNEST W. WESCOTT.